United States Patent
Hoffmann et al.

(10) Patent No.: US 6,172,341 B1
(45) Date of Patent: Jan. 9, 2001

(54) ELECTRICALLY HEATABLE WATER KETTLE

(75) Inventors: Günter Hoffmann, Hofheim; Ralph Neuhäuser, Kronberg, both of (DE)

(73) Assignee: Braun GmbH (DE)

( * ) Notice: Under 35 U.S.C. 154(b), the term of this patent shall be extended for 0 days.

(21) Appl. No.: 09/488,492

(22) Filed: Jan. 20, 2000

(30) Foreign Application Priority Data

Feb. 11, 1999 (DE) .............................................. 199 05 641

(51) Int. Cl.⁷ .............................. A47J 27/21; A47J 31/56; A47J 31/58
(52) U.S. Cl. .............................................. 219/441; 99/281
(58) Field of Search .................................... 219/429, 435, 219/438, 441; 99/337, 280, 323.3, 281

(56) References Cited

U.S. PATENT DOCUMENTS 5,429,039   7/1995   Chang .

FOREIGN PATENT DOCUMENTS

| 29603838 | 6/1996 | (DE) . |
| 19736821 | 2/1999 | (DE) . |
| 5-115372 | 5/1993 | (JP) . |
| 97/33507 | 9/1997 | (WO) . |

Primary Examiner—Joseph Pelham
(74) Attorney, Agent, or Firm—Fish & Richardson P.C.

(57) ABSTRACT

The invention is directed to a water kettle (1) including at the junction between the handle (18) and the housing (2) a safety arrangement (64) comprised of a button, an actuating element (44) and a detent lever, which allows operation of the water kettle (1) only when the lid (26) closes the opening (48) of the water kettle (1). Opening of the lid (26) automatically turns off the water kettle (1). The risk of an operator being scalded is thereby essentially eliminated. Manipulation of the water kettle (1) is also facilitated by the automatic shutoff feature of the water kettle (1) when the lid (26) is opened.

11 Claims, 5 Drawing Sheets

ELECTRICALLY HEATABLE WATER KETTLE

This invention relates to an electrically heatable water kettle comprising a vessel having a bottom with an upwardly adjoining circumferential side wall on which is formed a handle and whose free end is formed by an opening essentially closable by a lid, having an electric heating unit arranged in proximity to the bottom and adapted to be switched on and off by a mechanically controlled switch so that, with the appliance switched on, it heats any water contained in the vessel, having an actuating element coupled to said switch and operable by hand so that its mechanical actuation transmits a movement to the switch, and having a button acting on the lid and operable by hand so that its actuation releases the lid for opening.

A water kettle of this type is already commercially available and is marketed by the company Petra Elektrik, D-89331 Burgau under the name "Wasserkocher WK 12". The lid to close the vessel's opening can be opened and closed by a button mounted above the handle on the vessel's wall and on the lid. In the lower area of the water kettle there is an actuating element which protrudes sideways from the handle and is mechanically connected to a switch for switching off and on the heating unit arranged in proximity to the bottom.

It is an object of the present invention to provide a water kettle increasing the safety of the appliance such that in particular the risk of a user's hand being scalded can be essentially eliminated.

This object is accomplished in accordance with the invention by the features of the characterizing portion of patent claim 1. Thanks to the invention it is ensured that the heating unit of the water kettle is in operation only when the lid closes the vessel securely. As soon as the lid uncovers the vessel's opening during operation of the water kettle, the heating unit is) switched off. The advantage of this arrangement is that the production of superheated steam leaving the vessel's opening decreases and not too much boiling water is able therefore to escape from the opening. Scalding of a user's hand by accidentelly reaching into the opening is also reduced because super-heated steam stops escaping from the opening just a short time after the heating unit is switched off. Thanks to the safety arrangement of the present invention the water kettle will never again be left in the kitchen boiling with its lid open and hence opening uncovered. Nor will accidental tipping of the water kettle result in unpleasant scalding because during boiling the vessel's opening is always closed by the lid. To make it possible, for simplicity's sake, to fill water into or pour out water out of the water kettle in limited amounts while at the same time allowing steam to escape during the boiling process even when the lid is "closed", the outlet and inlet location is not completely closed by the lid but as a rule is covered by a sieve. The cross section of the inlet and outlet location is so small however as to permit only a limited amount of hot water to escape through this particular location or should the water kettle topple. Unpleasant scalding is therefore practically ruled out.

When water is boiled it invariably enters a brief nucleate boiling phase until the thermostat device automatically switches off the heating unit. The safety arrangement of the present invention protects in particular children from accidents because it is only when the lid of the vessel's opening is locked that they are able to switch on the water kettle. It is impossible to reach unintentionally into the boiling water kettle because the lid of the vessel's opening closes to such an extent that even small children's hands are unable to reach into the opening of the outlet and inlet location while the water kettle is in operation.

The user friendliness and safety of the water kettle are further improved by the features of patent claim 2. As soon as the lid is opened by the button, the heating unit is automatically switched off and with it the water kettle. This cuts the time the water continues to boil after reaching boiling point so that the water has settled again by the time is lid is opened. For this purpose the water kettle is equipped with means which do not allow the lid to flip fully open the instant the button is pressed but raise it only slightly from the opening.

The devices for releasing and locking the switch and the lid may be mechanical or electromechanical means controlled by an electronic control. Electromechanical means include, for example, relays which convert electric pulses into mechanical movements which then lock the lid while at the same time releasing the actuating element, that is, the switch for switching on. Such electromechanical solutions are relatively elaborate and expensive however. Purely mechanical means are more economical and equally effective.

According to the features of patent claim 3, the follower device provided on the actuating element serves to lock the button in its movement when the lid is in its open position. This is done by the detent element, which in turn locks the actuating element, which ultimately transfers its detent action to the button.

At this point it should be noted that the lid's open position refers not only to that position in which the lid has visibly uncovered the opening but also that position in which the lid still covers the opening but the closing device for closing the lid on the vessel has been actuated by a certain amount. Hence this type of open position begins shortly before the safety arrangement releases the lid for opening or precisely at the instant said safety arrangement has released the lid for opening. This is intended to preclude with certainty the case that as a result of an accumulation of tolerances which inevitably occur during the production of the detent element, the actuating element, the button and the lid following their assembly, the lid has uncovered the vessel's opening slightly while yet allowing the actuating element to be switched on.

By virtue of the features of patent claim 4, both the button and the actuating element are positively controlled not by electromechanical means but by purely mechanical means in dependence on the detent element, so that the actuating element, constructed preferably as a rocker control, and the button, which in turn is dependent thereon, can or cannot be moved in dependence upon a specific position of the detent element. A lever mechanism is particularly easy to manufacture for this purpose since it is comprised only of at least three levers preferably made of plastic and mechanically linked in such a way as to enable the electric switch to be switched on only in certain positions of the lid.

The features of claim 5 improve the operation of the lid. In this arrangement the button can be mounted to slide back and forth, to tumble, to pivot, to rotate or to move in any other way. When the button is actuated with the lid closed, the lever device provided on the lid releases the lock on the vessel to open the lid, enabling the lid to flip partly open, i.e., just far enough for the ends of the levers to rest with their ramps against the upper edge of the water kettle's opening. When the lid is closed, the levers then engage, with a snap action, in the detent holes provided on the vessel, and the actuating element is released to switch on the switch.

According to the features of patent claim 6, the axes of rotation of the lid, button, actuating element and detent element are arranged in separate positions on the vessel's housing, partly for safety reasons and partly because of the limited play of forces. This results ultimately in the safety arrangement being activated even when minor actuating forces are applied by a user to the button or the rocker control. Viewed from the bottom up (FIGS. 1 to 5), the axis of rotation of the detent lever is followed by the axis of rotation of the actuating element, then the axis of rotation of the lid, and finally the axis of rotation of the button. The leverage is calculated for the kinematics to work smoothly, safely, extremely reliably and exactly in minimum space.

According to the features of patent claim 7, the rocker control and the push-rod are coupled with each other mechanically through a joint mechanism. At the same time the control pins serve as stops for the detent element, thus controlling in simple manner the actuating element in dependence upon on the position of the button.

The features of patent claim 8 are provided to permit simple operation by means of parallel extending pivot axes of the water kettle.

By virtue of the features of patent claim 9, the actuating element and the button are particularly readily accessible from above and are very easy to identify by the user. With the lid closed it is thus possible, using a finger of the hand holding the lid, to actuate the control field of the button in order to open the lid. At the same time the button thus causes the actuating element and hence the switch, if it was on, to be switched off. Furthermore, the fact that the button and the actuating element are arranged in proximity to the junction between the handle and the vessel's side wall means that maloperations are prevented when gripping the water kettle by the handle; this is particularly true because the handle surface is positioned away from the actuating element and the button but just far enough for this hand to still be able to operate the button or the actuating element on the top side when holding the water kettle, should this be required.

The split design of the actuating element in accordance with the features of patent claim 10 affords greater ease of manufacture particularly because one of the parts has a very elongated section. Furthermore, the split design enables different materials to be used. For example, the rocker control can be made preferably of a translucent material so that a shining pilot lamp, which can be provided preferably inside the rocker space, is visible from outside when the appliance is switched on, while the elongated second part can be made of a non-translucent and hence cheaper plastic material, for example. The split design of the actuating element also enables a rotary movement to be converted into an axial movement, similar to a crank mechanism, in order to enable easy actuation of the switch mounted underneath the bottom of the water kettle in its position remote from the actuating element.

Since the electric switch and its temperature control device for switching on the heating unit of the water kettle are mounted underneath the bottom of the water kettle's vessel while the actuating element is mounted far above on the handle, it is necessary for the push-rod to make another bend at the bottom, as disclosed by the features of patent claim 11. The angled rocking lever is indirectly coupled with the switch via an adjoining rocker and is connected to the push-rod via a hinged joint.

An embodiment of the present invention will now be described in more detail in the following with reference to the accompanying drawing. In the drawing, FIG. 1 is a scaled-down side view of the safety arrangement with heating unit and lid provided in the housing of the water kettle, said water kettle's housing being shown only schematically and therefore in broken lines, and said lid being shown in open position;

Figure 1:
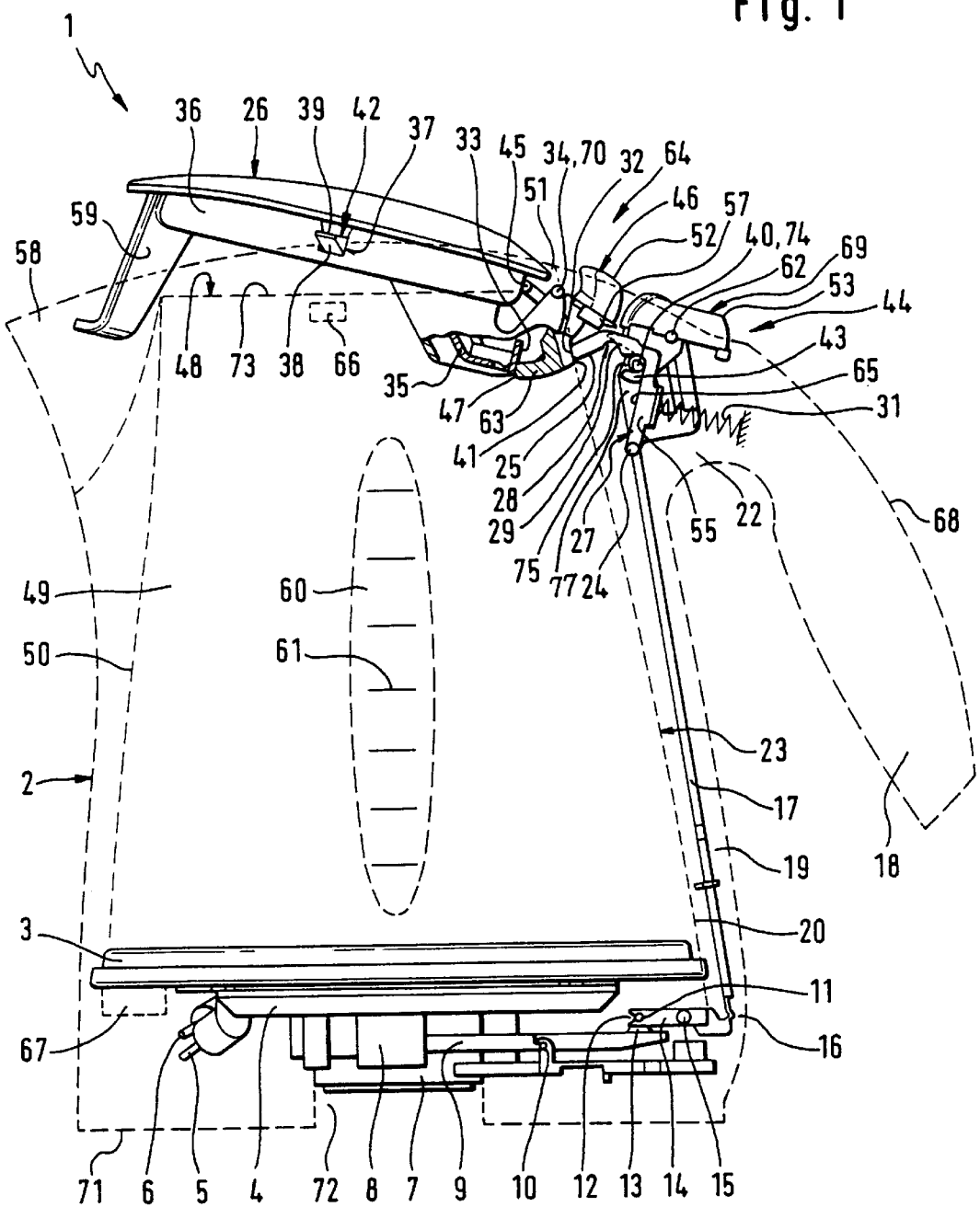

In FIGS. 1 to 4 the electrically operated water kettle 1 is comprised of a housing 2 made preferably of plastic material or high-grade steel and presented in the drawings only as a broken outline. The housing 2 is formed as an essentially tubular vessel 49 in the lower part of which is fastened an inserted steel bottom 3 with sealing effect. Underneath the bottom 3 and fastened or soldered or welded to it with good heat conducting effect is an annular heating unit 4. According to FIGS. 1 to 3 the heating unit 4 has at each of its ends a contact lug 5, 6 which is electrically connected via leads, not shown in the drawing, to a connector arrangement 7 provided on the bottom 3 within the tubular heating unit 4. Provided in the interior of the housing of the connector arrangement 7 is an electric switch 8, not shown in more detail in the drawing, which is mechanically connected via a rocker 9 to a rocker control 69. In the off position of the switch 8 (FIGS. 1 and 2) the rocker 9 extends essentially parallel to the bottom 3 and, at roughly its center point, is mounted for rotation within certain limits on a bearing trunnion 10.

The connector arrangement 7 is comprised of preferably circular switching elements (not shown) which are provided in the form of two switching tabs extending concentrically in spaced relationship to each other and adapted to be coupled with a mating connector (not shown) which, conforming to these dimensions, is provided in a base unit housing not shown in the drawing. The mating connector is connected via an electric lead to a socket-outlet plug (not shown). Access to the connector arrangement 7 is provided through an opening 72 in the bottom lid 71 of the housing 2. The thus constructed connector arrangement supplies the water kettle 1 with electricity as soon as said kettle sits on its base unit. The water kettle 1 is transformed by the connector arrangement 7 into a so-called cordless water kettle 1.

Figure 4:
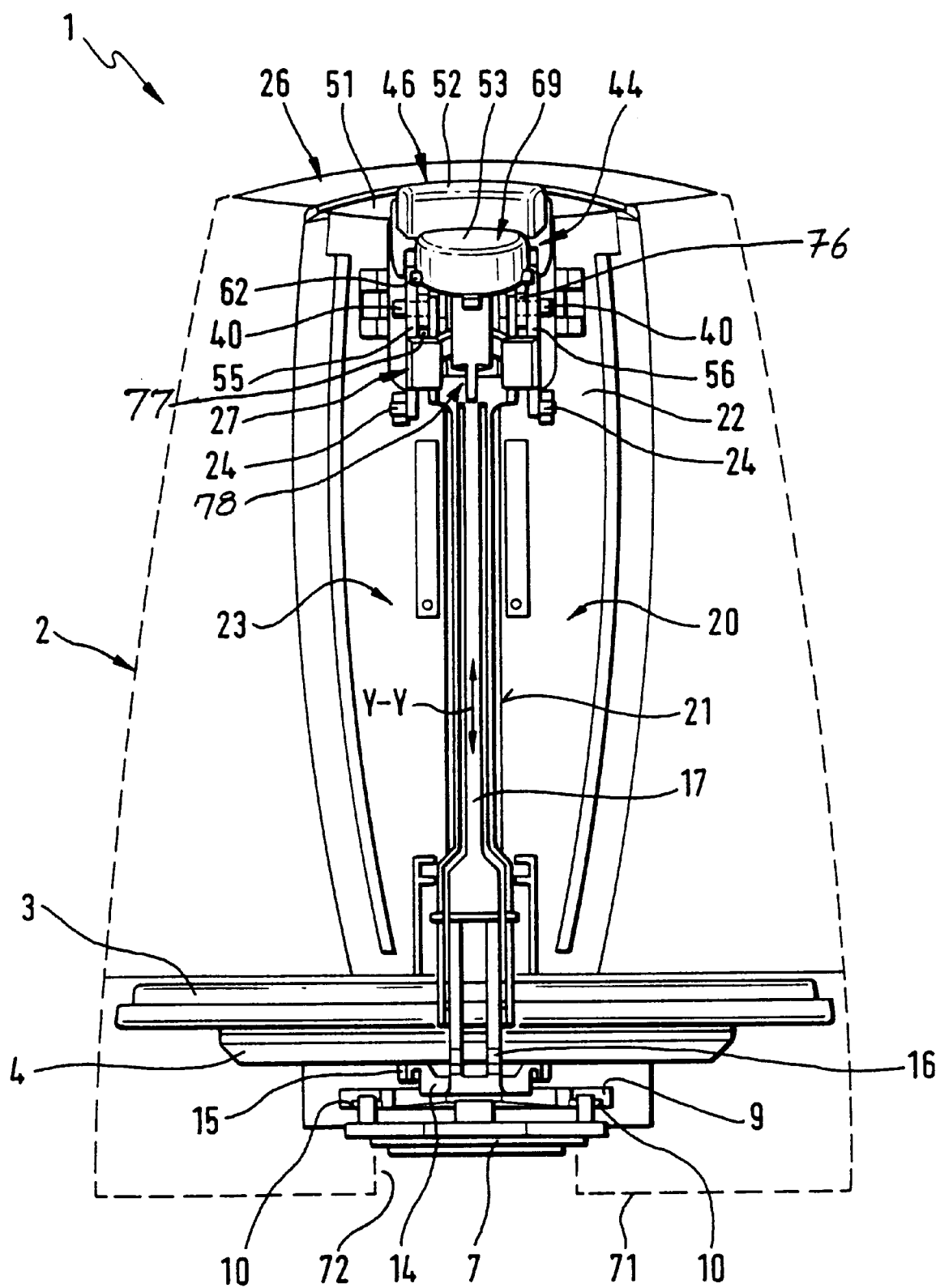
FIG. 4 is a side view, looking in the direction X, of the safety arrangement of FIG. 2 with the handle removed.

Projecting upwardly from the end of the rocker 9 remote from the switch 8 is a bearing block 13 on which two second bearing trunnions 11 are arranged to extend side by side in transverse direction, on which trunnions a rocking lever 14 having clamping grooves 12 arranged side by side is clipped and rotatably mounted. The rocking lever 14 itself is mounted for rotation about itself on the housing 2 around a first axis of rotation 15. The end of the rocking lever 14 on the side remote from the clamping grooves 12 is connected, via a flexibly movable hinge 16, to a push-rod 17 which is arranged at an angle to the rocking lever 14 and, in the space 19 encompassed by the handle 18 and the envelope surface 20 of the housing 2, is upwardly and downwardly slidable within a guide groove 21 along the envelope surface 20 in the direction Y—Y (FIG. 4).

In FIGS. 1 to 4 the push-rod 17 extends upwardly in the guide groove 21 into the space 22 formed by the space at the junction between the handle 18 and the envelope surface 23 of the housing 2. In this space 22 a detent element 27 configured as a detent lever extending upwardly and angled in the direction of the lid 26 is mounted on the housing 2 for rotation about a second axis of rotation 24 and, on its inner surface 25 facing thus second axis of rotation 24, has an abutment surface 29 which is formed in a recess 28 and has an adjoining first stop surface 30 towards its angled corner. With a second stop surface 32 provided on the tip of its angled free end, the detent lever 27 is maintained, by the force of a compression spring 31, in engagement with a first take-up surface 41 formed on a button 46. This state persists however only until the control pins 40 provided on the push-rod 17 strike against the end surface 65 of the detent lever 27.

When the lid 26 is opened further, the first take-up surface 41 moves away from the second stop surface 32 because the detent lever 27 strikes with its end surface 65 against the control pin 40 and is therefore inhibited to rotate anti-clockwise. The lines connecting the center points of the control pins 40 also form the crank axis 74 between the rocker control 69 and the push-rod 17. It should also be noted that, in order to improve the bearing, the lid 26, the button 46, the actuating element 44 and the detent lever 27 always have either end thereof supported through their joint axes, and that these parts can also be actuated therefore in the direction of the top side 68 of the handle 18.

Figure 2:
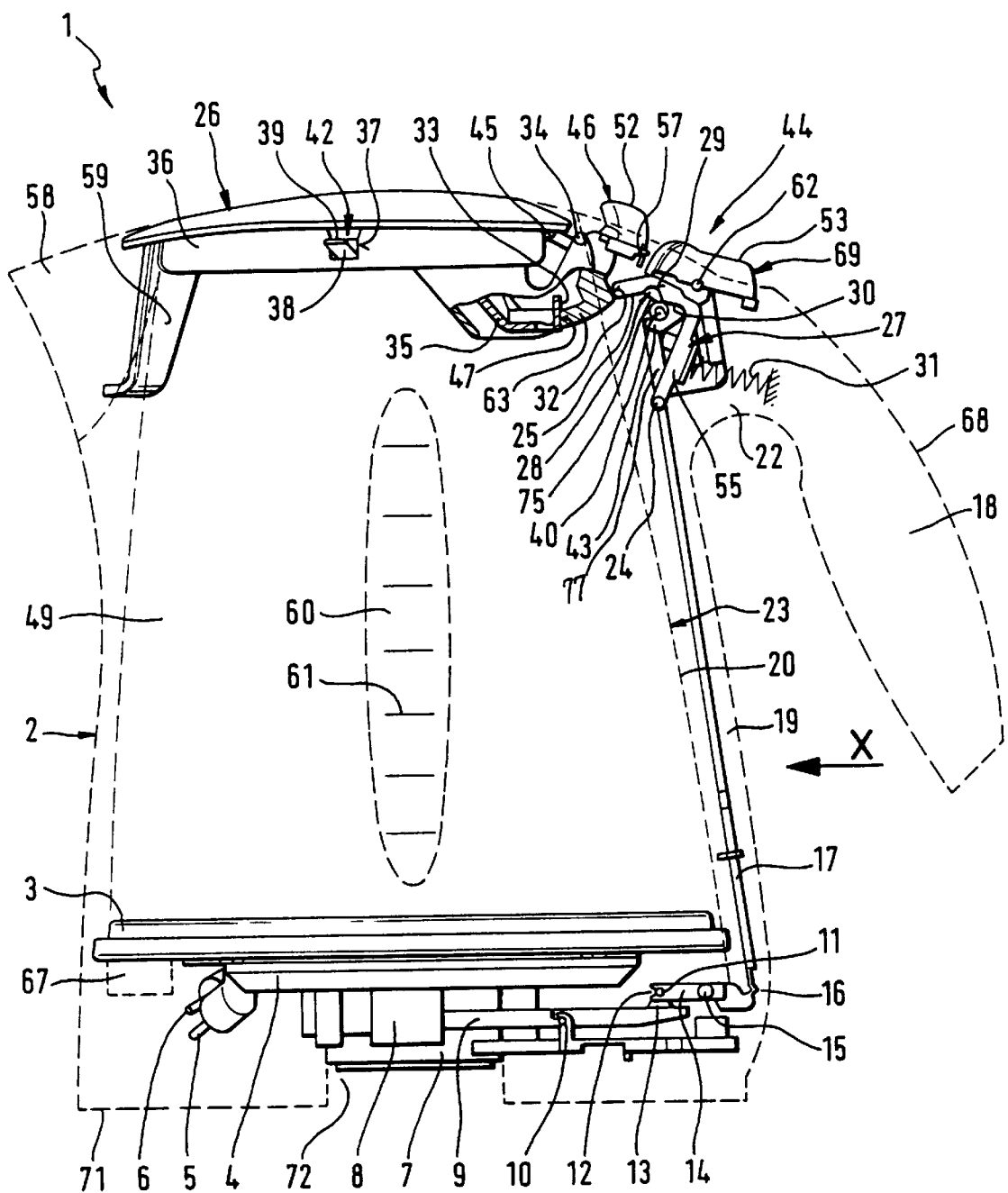
FIG. 2 is a side view of the embodiment of FIG. 1, showing however the lid in its closed position while the actuating element is still in its off position.
Figure 3:
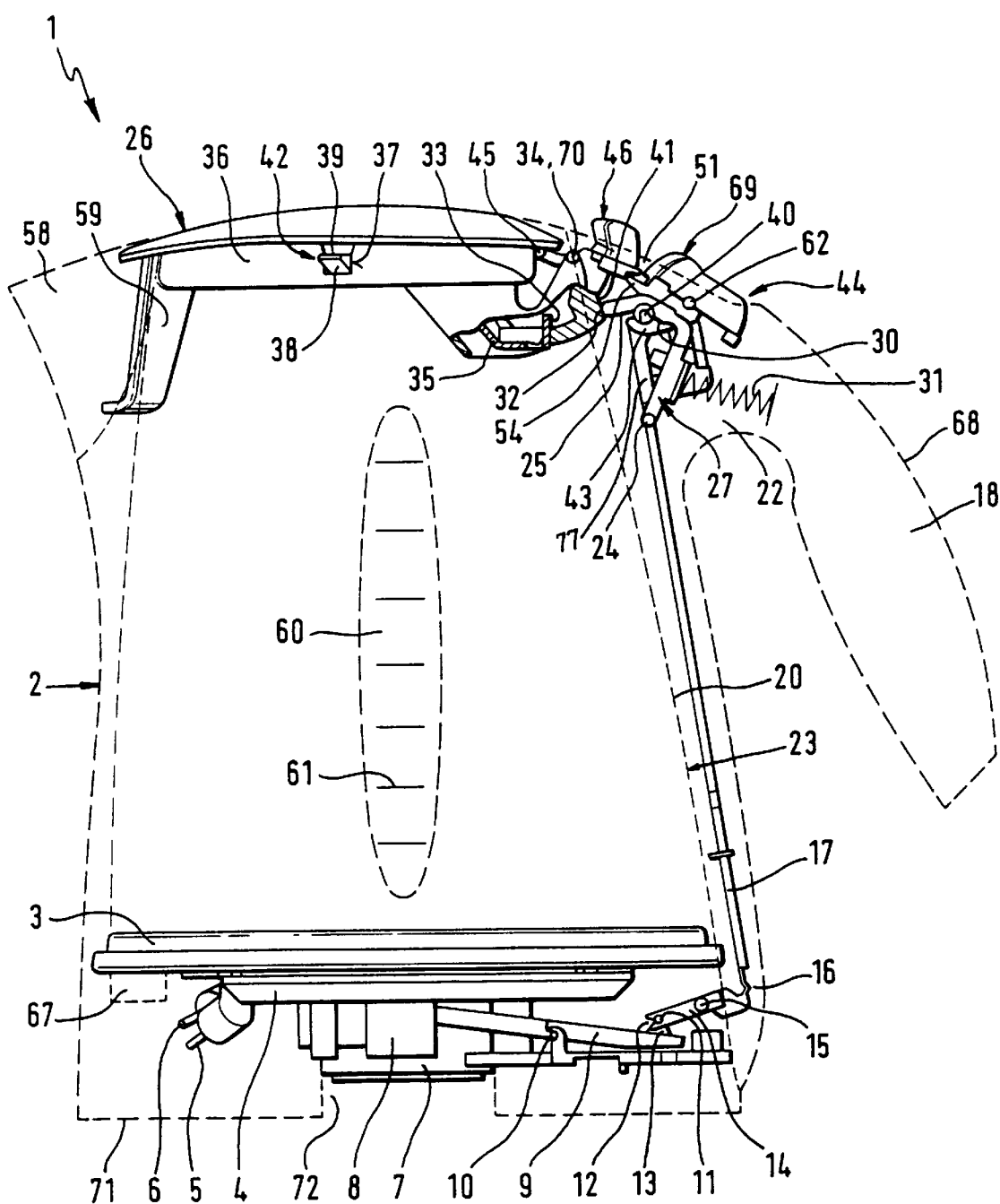
FIG. 3 is a side view of the safety arrangement of FIG. 2, showing however the actuating element turned to its on position with the lid closed.

According to FIGS. 1 to 3 the lid 26 is rotatably mounted on the housing 2 via two trunnions 70 (FIG. 5) provided on the lid, said trunnions forming a common third axis of rotation 34 which, as shown in FIGS. 1 to 3, is provided above and—viewed vertically—slightly to the left of the first take-up surface 41. Provided to the left at roughly the same height as the third axis of rotation 34 of the lid 26 is a fourth axis of rotation 45 formed in the housing 2 and having rotatably mounted thereon the button 46 for opening and closing the lid 26.

According to FIGS. 1 to 5 the button 46 has an angle arm 63 extending downwardly and away to the left and having at its one end the first take-up surface 41 and at its other free end a third stop surface 47 abutting a second take-up surface 33 of a slide 35 carried in the lid 26. The slide 35, which is displaceable essentially horizontally in the lid 26 against the force of a spring (not shown), actuates, when displaced to the left (FIGS. 2, 3), the levers 42 which extend inside the lid 26 in transverse direction to the slide 35 and are movable radially inwardly and outwardly by the slide 35, said levers projecting racially through openings 37 provided on both sides above the rim 36 of the lid 26 and having on their bottom side a ramp 38 extending upwardly at a slight inclination and a detent surface 39 on their top side. With the lid 26 in closed position, the levers 42 engage in the detent holes 66 provided at the rim of the opening 48 of the vessel 49.

According to FIGS. 1 to 5 the push-rod 17 gives way at its upper free end to a fork structure 78 having fork sections 76, 77 and laterally protruding control pins 40 which are partly embraced in claw like fashion both from above and below by sections 43 formed in one integral piece on the rocker control 69. The rocker control 69 is thus connected securely and, within narrow limits pivotally, to the push-rod 17.

According to FIGS. 1 to 3 and 5, for greater ease of assembly the sections 43 have slits 75 on the left side which, expanding elastically, receive the control pins 40 on the rocker control 69 with a detent action. The rocker control 69 is rotated about the fifth axis of rotation 62 and is pivotally mounted by this means in the housing 2 of the water kettle 1. The rocker control 69 forms a component which is jointed to and, within narrow limits pivotal about, the control pins 40 of the push-rod 17, and which combines with the push-rod 17 to form the actuating element 44.

Depending on the pivoting position of the detent lever 27, the control pin 40 engages either the first stop surface 30 (FIGS. 1 and 5) or the abutment surface 29 in the recess 28 of the detent lever 27 (FIG. 3). If the control pin 40 engages the abutment surface 29 in the recess 28, the rocker control 69 and hence the actuating element 44 is in its switch-on position such as is indicated by the water kettle 1 of FIG. 3. By contrast, if the control pin 40 engages the first stop surface 30 of the de(tent lever 27, the rocker control 69 and hence the actuating element 44 is in its switch-off position such as is indicated by the water kettle 1 of FIG. 1. If the control pin 40 lies exactly at that point where, according to FIG. 2, the first stop surface 30 intersects with the abutment surface 29, the water kettle 1 is in stand-by position, i.e., the lid 26 closes the opening 48 of the vessel 49 accommodating the water for heating it therein, which vessel is indicated schematically in FIG. 1 by the tubular or frusto-conical wall 50 shown in broken lines. The push-rod 17, the rocker control 69, the button 46, the detent lever 27 and the slide 35 with its levers 42 form the safety arrangement 64 of the water kettle 1.

According to FIGS. 1, 2, 3 and 5, the button 46 and the rocker control 69 project through a cutout 51 upwardly out of the top side 68 of the handle 18 and have a control surface 52 and 53, respectively. From FIG. 3 in particular it becomes apparent that a follower device 54 in the form of two hooks arranged side by side is formed on the front surface of the rocker control 69, said hooks being provided, according to FIG. 4, between the two angle legs 55, 56 of the detent lever 27 and engaging in their detent position of FIGS. 1 and 5 a detent surface 57 of the button 46 from underneath. Hence the button 46 is prevented from being actuated downwards on account of the locked rocker control 69 (FIG. 1). To make this position even clearer, reference is made to FIG. 5 in which the area of the button 46, the area of the rocker control 69 and the upper actuating element 44, and the area of the detent lever 27 are shown in a scaled-up view for clarity of illustration. The follower device 54 of the rocker control 69 is arranged—like the U-shaped fork structure 78 with its fork sections 76, 77 on the ends of the push-rod 17 (FIG. 4)—between the legs 55, 56 of the detent element 27, while the angle arms 63 lie roughly on the same plane as the legs 55, 56. To avoid repetitions, the most important reference numerals were transferred by and large from FIG. 1 to all the other Figures.

At this point it should also be noted that the compression spring 31 may also be configured as a leaf spring extending along the housing 2, which then bears against the legs 55, 56 (FIG. 4), urging them, according to FIGS. 1 to 3 and 5, invariably anti-clockwise against the first take-up surface 41. As becomes further apparent from the Figures, the detent lever 27, the actuating element 44—comprised of the rocker control 69, the push-rod 17, the rocking lever 14 and the rocker 9—the button 46 and the lid 26 have each either end thereof supported through their respective axes of rotation 24, 62, 45, 34.

According to FIGS. 1 to 3, a pouring spout 58, into which a baffle plate 59 projecting downwards from the lid 26 extends when the lid 26 is closed, adjoins the opening 48 on the side remote from the handle 18. The baffle plate 59 serves to make it impossible for bubbling water (not shown) in the vessel 49 to exit through the pouring spout 58 during the boiling process. Furthermore, a sieve, not shown in the drawing, is arranged in this pouring spout 58 to hold back any lime sediment at the bottom 3 when pouring out the water.

According to FIGS. 1 to 3 a downwardly extending oval sight glass 60 having graduations 61 is arranged on the envelope surface 20 of the water kettle 1 in order to be better able to identify the level of water in the vessel 49.

The mode of operation of the water kettle with the safety arrangement 64 of the invention according to FIGS. 1 to 5 is described below.

Mode of operation with the lid open

Figure 5:
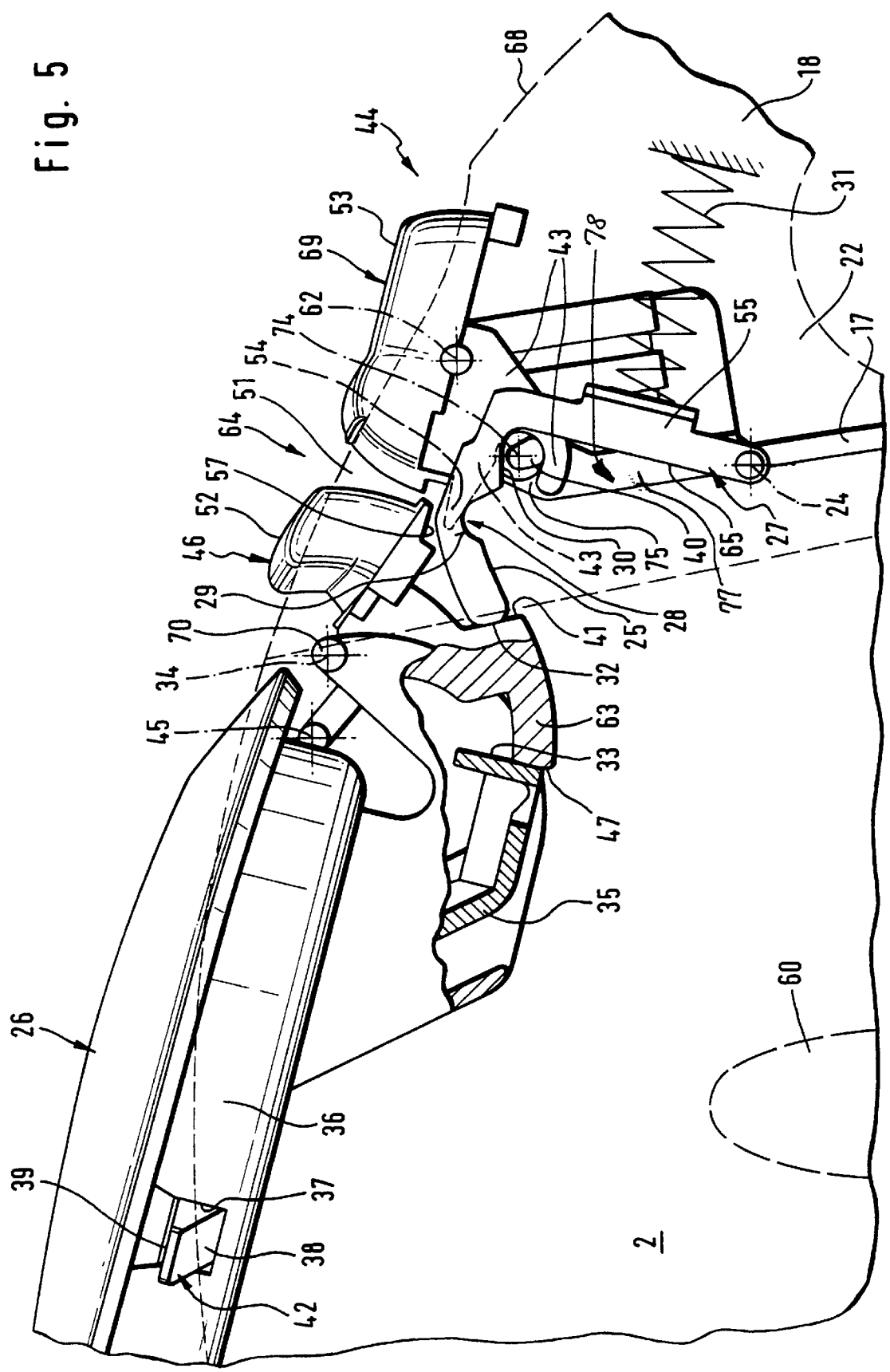
FIG. 5 is a scaled-up section of the side view in the area of the locking device of FIG. 1.

In the off position of the water kettle 1 shown in FIGS. 1 and 5, the lid 26 can be opened partly—as shown in FIG. 1—or fully, i.e., it uncovers the opening 48 in order to pour in water. Water can then be poured through the opening 48 into the vessel 49 until the water level indicates the desired height at the graduations 61 on the sight glass 60. The water kettle 1 can be placed by means of its connector arrangement 7 on a mating connector arrangement, not shown in the drawing, which is provided in a base unit and conformably shaped to match the connector arrangement 7. As a result of the coupling, the mating connector arrangement supplies the connector arrangement 7 of the water kettle 1 with electricity, albeit only as far as the electric switch 8 provided in the connector arrangement 7 in the off position (lid 26 open). Considering that a connector/mating connector arrangement of this type also exists, for example, on the water kettle initially referred to and manufactured by the company Petra Elektrik, being hence disclosed, it will not be de(scribed in any more detail at this point but full reference thereto is herewith made.

In the of f position shown in FIGS. 1 and 5 the switch 8 is deactivated, i.e., the rocker 9, the rocking lever 14, the pushrod 17 and the actuating element 44 are in a position corresponding to the switch-off position of the water kettle 1 according to FIG. 1. According to FIGS. 1 and 5, in this position the control pins 40 strike against the first stop surface 30 of the detent lever 27—even with a nearly closed or fully opened position of the lid 26 relative to the opening 48—in such a way that it is impossible for the rocker control 69 to turn clockwise about the fifth axis of rotation 62, meaning into the switch-on position. Hence the actuating element 44 cannot be moved. This is also assured by the sections 43 which partly embrace the control pins 40 provided on the fork sections 76, 77 The detent lever 27 thus prevents the rocker control 69 being turned and hence the push-rod 17 being pushed in the direction Y (FIG. 4) upwards into the switch-on position.

Considering that the control pins 40 of FIGS. 1 and 5 are engaged not only from above by the first stop surface 30 but also from the right-hand side by the inner end surfaces 65, the detent element 27 is unable to turn any further in anti-clock-wise direction although the compression spring 31 urges from the outside against the detent element 27. Hence the switch 8 is perforce in its off position and the heating unit 4 deactivated even when the lid 26 is slightly raised from the opening 48.

Mode of operation when closing the lid

If, after filling the water kettle 1 with water, the opening is to be closed with the lid 26, the latter is pressed by an operator's hand (not shown) against the rim 73 of the opening 48 until the levers 42 move—by instigation of the ramps 38—into the space in the lid 26, and the lid 26 initially occupies its closed position shown in FIG. 2 and then, after switching on the water kettle, its locking position shown in FIG. 3. As soon as the lid 26 reaches the closed position according to FIG. 2, the levers 42 are urged radially outwardly by the force of a biased spring (not shown), automatically engaging thereby in the detent holes 66 with a snap lock action. The lid 26 has thus adopted its closed position and can be opened again only by retracting the levers 42 using the button 46.

At this point it will be understood, of course, that upon closing the lid 26 the button 46 and the detent element 27 were also initially moved from the position of FIG. 1 into the position of FIG. 2. Upon closing the lid 26, not only does the slide 35 with its second take-up surface 33 urge the angle arm 63 and hence the button 46 into its initial position but the detent element 27 is simultaneously swiveled by the first take-up surface 41 so far in clockwise direction about the second axis of rotation 24 that it occupies the stand-by position shown in FIG. 2, i.e., the detent element 27 adopts a position such that the control pin 40 lies at the junction between the first stop surface 30 and the abutment surface 29 of the detent element 27.

Switching on the water kettle

In stand-by position, meaning the absolute closed position of the lid 26, the water kettle 1 can be switched on by turning the rocker control 69 clockwise. By turning the rocker control 69 about the fifth axis of rotation 62, the control pins 40 of FIG. 3 are moved upwards by the sections 43 such that they engage in the recesses 28 of the detent element 27. As this occurs, the push-rod 17 is raised in the direction Y (FIG. 4). At the same time the rocking lever 14 is moved through the hinge 16 anti-clockwise about the first axis of rotation 15 such as to cause the rocker 9 to be turned through the second bearing trunnion 11 clockwise about the bearing trunnion 10. The switch 8 provided in the connector arrangement 7 is activated and the heating unit 4 supplied with electricity. The switch-on position is clearly shown in FIG. 3.

The heating unit 4 can now heat up and transfer heat to the highly heat conductive bottom 3, via which the water (not shown) contained in the vessel 49 is heated. A thermostatic control device 67 (indicated only schematically) fastened to the underside of the bottom 3 is integrated in the electric circuit between the heating unit 4 and the switch 8, de-energizing the heating unit 4 as soon as the water has reached the pre-set temperature or its boiling temperature, which can even result in maximum nucleate boiling of the water.

Aborting the heating process

In the switch-on position according to FIG. 3 of the water kettle 1, the lid 26 can be opened with the button 46 only if at the same time the rocker control 69, that is, the actuating element 44, is moved back into its off position. If the button 46 is turned clockwise to open the lid 26, the lid 26 is opened—as already described in the foregoing—but the rocker control 69 is compelled to follow this movement because the follower device 54 is also moved downwards through the detent surface 57 provided on the button 46 when the latter is turned, whereby the rocker control 69 is turned anti-clockwise about its axis of rotation 62. Consequently, the push-rod 17 is moved downwards in the direction Y (FIG. 4), whereby the rocking lever 14 is turned clockwise and the rocker 9 anti-clockwise. The switch 8 is switched off as is shown by the position of FIG. 2. Considering that in the switch-on position of FIG. 3 downward movement of the control pins 40 is not impeded by the detent element 27, the rocker control 69 can be actuated anti-clockwise and hence the heating unit 4 switched off via the actuating element 44 at any time.

Mode of operation when opening the lid from its closed position:

If, with the detent element 27 still locked, the button 46 is turned clockwise by the control surface 52 about its axis of rotation 45 (the fourth) according to FIGS. 1 and 5, the first take-up surface 41 lifts itself clear of the second stop surface 32 and, with its third stop surface 47 the angle arm 63 urges the slide 35 to the left looking at, but not shown in, the drawing. Before this can happen, however, it is necessary for the slide 35 of FIG. 1 to be displaced sufficiently far to the left against the force of a spring provided in the lid 26, but not shown in the drawing, for the detent surfaces 39 formed on the levers 42 to move through the openings 37 into the space (not shown) inside the lid 26 such that they are no longer in engagement with the detent holes 66 (FIG. 1) provided on the rim of the opening 48.

As soon as the detent surfaces 39 are disengaged from the detent holes 66 the lid 26 flips into the partly open position shown in FIG. 1 and the slide 35 returns to its initial position (FIG. 1) as a result of the force of the spring (not shown). The ramps 38 lie against the rim 73 of the opening 48, thus allowing the lid 26 to rest on the opening 48. The lid 26 flips open partly as a result of the clockwise opening torque applied to the lid 26 by the button 46. This is so because the second take-up surface 33 of FIGS. 1 to 3 and 5 lies underneath the (third) axis of rotation 34 of the lid 26.

It should be noted at this point that it is also possible for the switch to turn itself off automatically—under thermal control—as soon as the set water temperature is reached, causing through the rocker 9 the actuating element 44 to be moved into its off position, as shown in FIG. 2. This also involves forcible resetting of the rocker control 69 by the switch 8, and theft rocker control cannot be switched on again until after the lid 26 is opened once and then closed again.

What is claimed is:

1. An electrically heatable water kettle (1) comprising a vessel (49) having a bottom (3) with an upwardly adjoining circumferential side wall (50) on which is formed a handle (18) and whose free end is formed by an opening (48) essentially closable by a lid (26), having an electric heating unit (4) arranged in proximity to the bottom (3) and adapted to be switched on and off by a mechanically controlled switch (8) so that, with the water kettle (1) switched on, it heats any water contained in the vessel (49), having an actuating element (44) coupled to said switch (8) and operable by hand so that its actuation transmits a movement to the switch (8), and having a button (46) acting on the lid (26) and operable by hand so that its actuation releases the lid (26) for opening (48), characterized in that a detent element (27) is provided which mechanically releases the actuating element (44) for activating the switch (8) only when the lid (26) closes the opening (48).

2. The water kettle as claimed in claim 1, characterized in that when the lid (26) is opened by the button (46) this perforce actuates also the actuating element (44) and deactivates the switch (8).

3. The water kettle as claimed in claim 2, characterized in that provision is made for a follower device (54) acting on the actuating element (44) on operation of the button (46), said follower device bearing against the actuating element (44) as the lid (26) is opened, moving it into its off position.

4. The water kettle as claimed in any one of the claims 1 to 3, characterized in that the detent element (27) is movable into a position releasing the switch (8) as a result of the movement of the lid (26) into the closed position, while with the lid (26) in the open position it is movable into a position locking the switch (8), with a control pin (40) which corresponds with the detent element (27) being provided on the actuating element (44), said control pin engaging a first stop surface (30) provided on the detent element (27) with the lid (26) in the open position and being therefore inhibited in its movement while, with the lid (26) in the closed position, it is able to engage in a recess (28) provided on the detent element (27), thereby permitting a movement of the actuating element (44) and hence activation of the water kettle (1).

5. The water kettle as claimed in claim 4, characterized in that for opening the lid (26) the button (46) acting on the lid (26) is slidably, preferably rotatably, mounted on the housing (2), the button's one arm (63) causing the mechanical connection to a latching arrangement (35, 37, 38, 39, 42) provided on the lid (26) to adopt the open position while, as this occurs, the detent element (27) follows the rotary movement of the button (46) such as to inhibit the actuating element (44) in its rotation.

6. The water kettle as claimed in claim 4, characterized in that the actuating element (44) is comprised of two parts forming a crank mechanism, the one part being a rocker control (69) movable about its axis of rotation (62) and the other part a push-rod (17) converting the rotary movement into an up and down movement, and that the push-rod (17) and the rocker control (69) are connected with each other through control pins (40).

7. The water kettle as claimed in claim 6, characterized in that the push-rod (17) has a fork-shaped configuration at the end close to the button, that a respective control pin (40) is provided on the fork sections (76, 77), that the control pins (40) engage a respective slit (75) provided on the sections (43) of the rocker control (69), and that each control pin (40) corresponds with the inner surface (25) of the legs (55, 56) of the detent lever (27).

8. The water kettle as claimed in claim 6 or 7, characterized in that the rocker control (69), the detent element (27), the button (46) and the lid (26) are rotatable about pivot axes (62, 24, 45, 34) of their own which are spaced from, and extend essentially parallel to, each other.

9. The water kettle as claimed in claim 8, characterized in that the rocker control (69) and the button (46) project through a cutout (51) provided on the top side (68) of the handle (18) and include manually operable control surfaces (53, 52) situated adjacent to each other and accessible from outside.

10. The water kettle as claimed in claim 9, characterized in that the control surfaces (53, 52) are provided on the top side (68) in proximity to the lid (26).

11. The water kettle as claimed in any one of the claims 6 to 10, characterized in that in the area of the bottom (3) of the vessel (49) the push-rod (17) merges into an angled rocking lever (14) via a flexible hinge (16), that the rocking lever (14) is mounted on the housing (2) for rotation about a first axis of rotation (15), and that the rocking lever's end on the side remote from the flexible hinge (16) is connected with a racker (9) through a second bearing trunnion (12), said rocker having its central area pivotally mounted on the housing (2) via a first bearing trunnion (10) while its end on the side remote from the bearing trunnion (12) is connected with the switch (8) for switching on and off.

* * * * *

UNITED STATES PATENT AND TRADEMARK OFFICE
CERTIFICATE OF CORRECTION

PATENT NO.   : 6,172,341 B1  
DATED        : January 9, 2001  
INVENTOR(S)  : Ralph Neuhauser, Gunter Hoffmann It is certified that error appears in the above-identified patent and that said Letters Patent is hereby corrected as shown below:

Column 10,
Line 56, "racker" should be -- rocker --.

Signed and Sealed this

Twelfth Day of March, 2002

Attest:

JAMES E. ROGAN
Attesting Officer     Director of the United States Patent and Trademark Office